United States Patent
Ries et al.

(10) Patent No.: US 11,852,489 B2
(45) Date of Patent: Dec. 26, 2023

(54) METHOD FOR DETERMINING THE POSITION OF A VEHICLE

(71) Applicant: DAIMLER AG, Stuttgart (DE)

(72) Inventors: Florian Ries, Stuttgart (DE); Frank Schuster, Böblingen (DE); Martin Haueis, Gärtringen (DE); Mohammad Ghanaat, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 532 days.

(21) Appl. No.: 17/254,539

(22) PCT Filed: Jun. 3, 2019

(86) PCT No.: PCT/EP2019/064330
§ 371 (c)(1),
(2) Date: Dec. 21, 2020

(87) PCT Pub. No.: WO2019/243031
PCT Pub. Date: Dec. 26, 2019

(65) Prior Publication Data
US 2021/0278220 A1 Sep. 9, 2021

(30) Foreign Application Priority Data

Jun. 22, 2018 (DE) .................... 10 2018 005 005.0

(51) Int. Cl.
*G01C 21/28* (2006.01)
*G01C 21/20* (2006.01)
*G01S 19/45* (2010.01)
*G01C 21/00* (2006.01)

(52) U.S. Cl.
CPC ............. *G01C 21/28* (2013.01); *G01C 21/20* (2013.01); *G01C 21/3844* (2020.08); *G01S 19/45* (2013.01)

(58) Field of Classification Search
CPC .... G01C 21/28; G01C 21/20; G01C 21/3844; G01S 19/45
See application file for complete search history.

(56) References Cited

U.S. PATENT DOCUMENTS

| | | | |
|---|---|---|---|
| 11,195,349 B2 * | 12/2021 | Kanou | ........... G06T 7/80 |
| 2011/0118979 A1 | 5/2011 | Mao et al. | |
| 2018/0306589 A1 * | 10/2018 | Holz | ........... G05D 1/0274 |

FOREIGN PATENT DOCUMENTS

| | | | |
|---|---|---|---|
| DE | 102016009117 A1 | 2/2017 | |
| DE | 102016214028 A1 | 2/2018 | |
| DE | 102016225213 A1 | 6/2018 | |
| DE | 102018004229 A1 | 11/2019 | |
| EP | 3426517 B1 * | 9/2022 | ........... B60L 11/182 |

OTHER PUBLICATIONS

International Search Report dated Sep. 5, 2019 in related/corresponding International Application No. PCT/EP2019/064330.
Written Opinion dated Sep. 5, 2019 in related/corresponding International Application No. PCT/EP2019/064330.
Office Action created May 20, 2021 in related/corresponding DE Application No. 10 2018 005 005.0.

* cited by examiner

*Primary Examiner* — Calvin Cheung
(74) *Attorney, Agent, or Firm* — PATENT PORTFOLIO BUILDERS PLLC (57) ABSTRACT

A method for determining the position of a vehicle involves determining a plurality of position hypotheses by comparing landmark objects detected by a sensor system of the vehicle with landmark objects stored in a map, in particular in a map section. By analyzing all position hypotheses and filtering out all false information using probabilistic analysis, a position hypothesis with an integrity value is determined. A position hypothesis with a position accuracy sufficient in a predetermined way for determining the position of the vehicle is determined by filtering according to predetermined limit values.

9 Claims, 8 Drawing Sheets

METHOD FOR DETERMINING THE POSITION OF A VEHICLE

BACKGROUND AND SUMMARY OF THE INVENTION

Exemplary embodiments of the invention relate to a method for determining the position of a vehicle.

US 2011/0118979 A1 discloses a method for determining the position of a vehicle. The position is estimated using a combination of data from a navigation system and data from a dead reckoning system. The determination of a map-matching position occurs using at least one satellite-based position and the position from the dead reckoning navigating in combination with a plurality of elements from a map. A determination of an integrity, i.e., the correctness, of the position estimation occurs by comparing a statistical calculation of the "map matching" position and the position estimation.

Exemplary embodiments of the invention are directed to a method for determining the position of a vehicle which is improved compared to the prior art.

In the method for determining the position of a vehicle according to the invention, sensor landmark objects detected by means of a sensor system of the vehicle are compared with map landmark objects stored in a digital map, in particular in a map section, and by forming landmark associations between the sensor landmark objects and map landmark objects, a plurality of position hypotheses are formed representing positions that are possible as vehicle positions. By analyzing all position hypotheses and their spatial relationships to each other by means of a probabilistic analysis, an integrity value is determined for each of these position hypotheses. By filtering these position hypotheses according to their integrity values, a subset of position hypotheses is determined which, with respect to their integrity values, fulfil a requirement for determining the position of the vehicle predetermined by an integrity limit value.

The method according to the invention is thus for landmark-based position determination. In already known methods, landmarks detected by sensors, for example signs, posts and/or other landmark objects, are compared with landmark objects stored in a highly accurate map. These known methods start with an initialization of the position, e.g., by means of a satellite-based localization system (GNSS), then predicate the position by means of vehicle odometry and correct the position with the closest position hypotheses from the previously mentioned matchings. In contrast to this well-known procedure, the matching is carried out in the three steps mentioned above for the solution according to the invention.

This means that a comprehensive landmark matching occurs first. Here, sensor landmark objects that have been detected over a predetermined period of time and/or over a predetermined distance, in particular sensor landmark objects that have already been passed by the vehicle, are compared with map landmark objects that are stored in the map section also known as the map horizon, i.e., not only the landmark objects closest to the current position are considered. The comparison takes place via a recorded history of landmark objects, also referred to as a signature. This comparison provides a plurality of position hypotheses. The subsequent analysis of all position hypotheses by means of the probabilistic analysis provides an integrity value for each of these position hypotheses, i.e., a measure of correctness of the landmark association between the sensor landmark object and the map landmark object on which the respective position hypothesis is based. The subsequent filtering of the position hypotheses according to their integrity values yields a subset of so-called "good enough hypotheses", i.e., position hypotheses whose integrity values meet the predetermined requirements. This requirement predetermines how reliable, i.e., how much integrity the position determination should have. In other words, it is predetermined how probable an unlimitable localization error may be at most.

The "good enough hypotheses" are processed in a localization filter that calculates the probability distribution of the vehicle position from the "good enough hypotheses". The localization filter is, for example, a histogram filter. Since only information with integrity, i.e., reliable information has been processed, the probability distribution calculated in this way is also integer. It thus provides reliable information on how likely the vehicle position is at any place on the map section under consideration.

The method according to the invention thus enables the calculation of a so-called "protection limit", i.e., a guaranteed upper error limit, with landmark-based position determination. Landmark objects can be any location-based features, even more abstract representations of sensor detections such as radar clusters, feature descriptors in an image or point/point clusters of a lidar point cloud.

In this method, however, not only the landmark associations closest to the current position from sensor-detected landmarks, such as signs, posts etc., are compared with landmark objects stored in the high-precision map, but the recorded histories (signatures) of the landmark objects are subjected to a probabilistic analysis before being processed in the position estimate. Thus, misleading information can be excluded with a calculable residual error rate, which can be adapted to the integrity requirements by varying the signature sizes.

Landmarks can be any location-based features, even more abstract representations of sensor detections such as radar clusters, feature descriptors in an image or point/point clusters of a lidar point cloud.

The method according to the invention enables an position determination having integrity without a global navigation satellite system. This is in particular advantageous if a visibility of satellites of the global navigation satellite system is too limited and so-called multipath effects are too large for other methods, for example for methods similar to RAIM (Receiver Autonomous Integrity Monitoring), i.e., in particular, when driving through street canyons and/or in a covered environment.

Furthermore, the method allows a combination with an integrity concept based on a global navigation satellite system. Only if the positions determined in both ways are secured with a protection limit, i.e., with an upper error limit, can they be merged to an even better secured position. An intersection of the protection limits, i.e., the upper error limits, increases the availability of narrower upper error limits for the individual procedures with a comparable false report rate. On the other hand, a false report rate that is several orders of magnitude lower is achieved by combining them.

BRIEF DESCRIPTION OF THE DRAWING FIGURES

Exemplary embodiments of the invention are explained in more detail below using drawings.

Here are shown:

FIG. 1 schematically, a process of determining a position of a vehicle on a map, FIG. 2 an application of a highly automated driving operation by positioning a vehicle on a highly accurate map, FIG. 3 a further application of a highly automated driving operation by positioning a vehicle on a highly accurate map, FIG. 4 schematically, a boundary box around a position of a vehicle, FIG. 5 schematically, a model distribution and an actual distribution of positioning information, FIG. 6 derivation of an error exceedance, FIG. 7 schematically, correlations which lead to a useful or misleading information gain, FIG. 8 schematically, a comparison of landmark objects from sensor data with landmark objects on a map, FIG. 9 schematically, a probabilistic analysis, FIG. 10 schematically, an inclusion of information, FIG. 11 schematically, an actual distribution of errors, and FIG. 12 schematically, an assumed distribution of errors.

Parts corresponding to one another are provided with the same reference numerals in all figures.

DETAILED DESCRIPTION

Using FIGS. 1 to 12, a method is described in the following for landmark-based position determination of a vehicle 1, in particular a determination of an upper limit for errors of such a landmark-based position determination.

Highly-automated driving (HAF) requires highly accurate maps, in particular topographical maps, to supplement information from a sensor system of a vehicle 1. A position determination determines the exact position of the vehicle 1 on such a map and thus provides an extended environmental model. However, to be able to use this extended environmental model seriously, for example for object lane assignments in a collision avoidance, the position determination must output an integral upper error limit PL in addition to the usual accuracy estimation (sigmas, standard deviation). The integral upper error limit thus represents an area in which the vehicle is located with certainty, if it is understood by certainty that a given permissible error rate, e.g., 1 error per 10,000,000 km is not exceeded. In the case of a GNSS-based position determination, i.e., position determination based on a global navigation satellite system, similar approaches already exist, for example, in the aviation sector. A so-called integrity monitoring (e.g., RAIM, Receiver Autonomous Integrity Monitoring) outputs upper error limits PL, called protection limits. In ground-based systems, the integrity monitoring is more difficult due to satellite coverage and multi-path effects. Furthermore, in vehicle construction, cost considerations and design considerations, in particular regarding antennas to be mounted on the vehicle 1, have to be taken into account, which lead to further performance limitations. Integrity monitoring concepts for landmark based position determination have thus so far been rare and do not go beyond an outlier detection or binary "seals of approval". A protection limit, i.e., an upper error limit PL, is not provided by any of these methods.

The method described below allows the calculation of such a protection limit, i.e., an upper error limit PL, with a landmark-based position determination. As in conventional landmark-based position determination, sensor-detected landmark objects LMS, e.g., signs, posts etc. are compared with map landmark objects LMK stored in the highly accurate map and retrieved from it. Landmarks can be any location-based features, even more abstract representations of sensor detections such as radar clusters, feature descriptors in an image or point/point clusters of a lidar point cloud. The comparison takes place between recorded histories (signatures) of sensor landmark objects and map landmark objects.

In the method, the comparison VLM of sensor landmark objects LMS, which are detected by means of the sensor system of vehicle 1, with map landmark objects LMK which are stored in the map, in particular in a map section KA, are retrieved from the map, creates landmark associations between the sensor landmark objects LMS and map landmark objects LMK, i.e., it is determined which sensor landmark objects LMS could match which landmark objects LMK, and based on the different possible landmark associations that can be formed with the set of sensor and map landmark objects, a plurality of position hypotheses are determined as possible vehicle positions. The map section KA is also referred to as a map horizon. By analyzing all determined position hypotheses and their spatial relationships to one another by means of a probabilistic analysis PA, an integrity value is determined for each position hypothesis, which is a measure for the reliability of the respective position hypothesis. For the integrity values, an integrity value limit value is predetermined. By filtering F the position hypotheses according to their predetermined integrity values with regard to the integrity limit value, a subset of position hypotheses is determined which fulfil a requirement predetermined by the integrity limit value, i.e., from the set of all determined position hypotheses, those position hypotheses are identified which have an integrity value sufficient for an integer position determination of vehicle 1, wherein the integrity limit value defines which integrity value is sufficient.

This means that a comprehensive landmark matching takes place first. All sensor landmark objects LMS that have been detected by the sensor system of vehicle 1 over a predetermined period of time and/or over predetermined route length, in particular also sensor landmark objects LMS already passed by the vehicle 1, are compared with the map landmark objects LMK stored in the map section KA. The comparison VLM is thus based on a recorded history (signature) of sensor landmark objects LMS. This comparison VLM provides a plurality of position hypotheses. The subsequent analysis of all position hypotheses by means of the probabilistic analysis PA provides an integrity value for each of these position hypotheses, i.e., a value for assessing the correctness of the landmark associations on the basis of which the respective position hypothesis has been formed. The subsequent filtering F of the position hypotheses according to their integrity values with respect to the predetermined integrity limit value provides a subset of position hypotheses, which is referred to as "good enough hypotheses" in the following. A "good enough hypothesis" is a hypothesis whose integrity corresponds at least to the integrity limit value. The integrity limit value predetermines the requirements of a position hypothesis for an integral localization of the vehicle 1.

From the set of "good enough hypotheses", which represent a set of probable vehicle positions, a probability distribution of the vehicle position is calculated in a localization filter II, which is designed as a histogram filter, for example. Since only integer information is processed in the localization filter, the calculated probability distribution also has integrity. It thus provides reliable information about how probable the vehicle position is on any place on the map section under consideration.

The method thus enables the calculation of the protection limit, i.e., the upper error limit PL, with landmark-based position determination.

In the following, the background of the method and its course are explained again in detail. First, the background of the method:

The method is suitable for carrying out a highly automated operation of vehicles 1. During such a highly automated driving operation (HAD), vehicles 1 need detailed knowledge of a route section ahead in order to plan necessary driving maneuvers accordingly. Corresponding environmental information, which can be determined by means of the sensor system of the vehicle 1, is however very limited with regard to range.

Thus, this environmental information is provided by a high-accuracy map, in which this environmental information is stored in relation to position. However, the vehicle 1 can only obtain the correct environmental information from the map if it can be positioned correctly on the map. For practical reasons, in particular due to available storage space and/or required processing effort, only a limited map section KA of the map, also called horizon or map horizon, is provided in the vehicle 1. Together with the position of vehicle 1, this map horizon provides an environmental model that supplements the sensor perception.

For positioning on the map, more precisely on this map section KA, the vehicle 1 can, for example as an alternative or in addition to a positioning on the basis of a global navigation satellite system (GNSS), compare predefined map landmark objects LMK, for example objects on the roadside, lane markings, posts and other structures, as well as lane attributes on the map with the corresponding sensor landmark objects LMS perceived by the sensor system of the vehicle 1 and thus determine the position of the vehicle 1 on the map.

Figure 1:
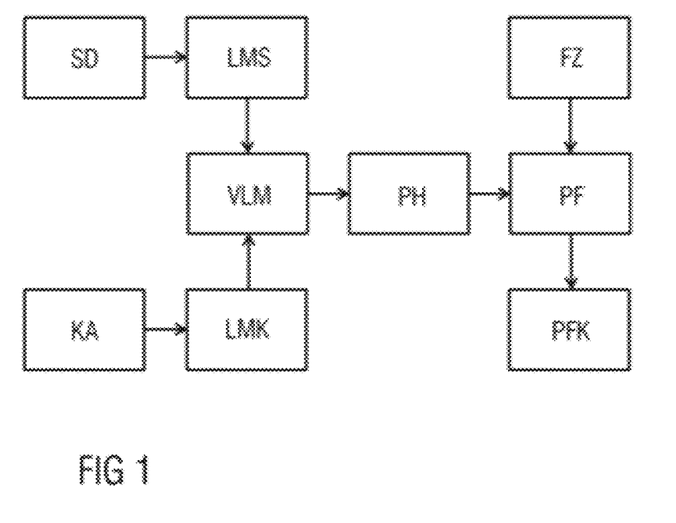

FIG. 1 shows a course of such a determination of the position PFK of the vehicle 1 on the map. Input data are sensor data SD of the sensor system of the vehicle 1 and the local map section KA. From the sensor data SD, possible landmark sensor objects LMS are determined. The map section KA is used to determine map landmark objects LMK recorded on the map. Now a comparison VLM of these landmark objects LMS, LMK is carried out. From this, several position hypotheses PH are determined. These position hypotheses PH and a driving state FZ of the vehicle 1 are processed in a probabilistic filter PF and as a result of this processing, the position PFK of the vehicle 1 on the map is determined.

Figure 2:
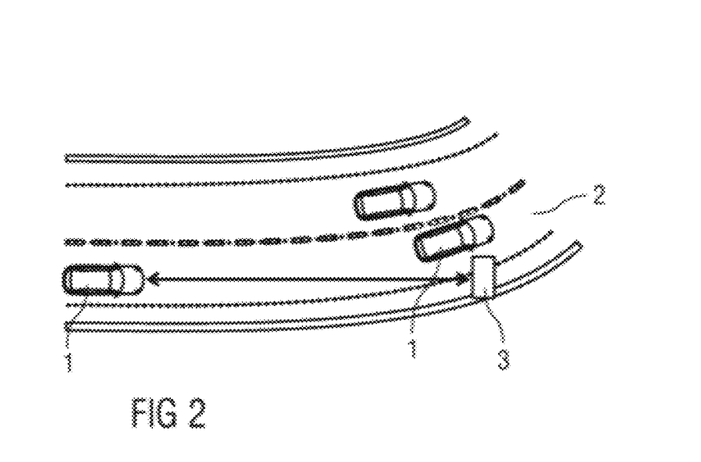
Figure 3:
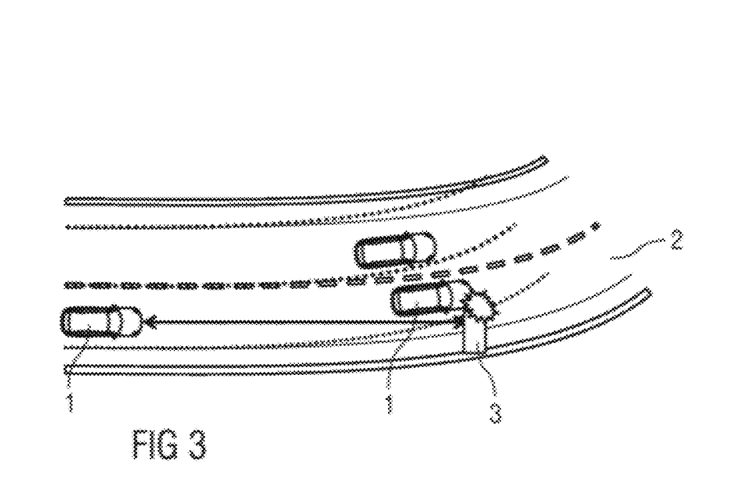

FIGS. 2 and 3 show exemplary applications of a highly automated driving operation by means of a positioning of the vehicle 1 in a highly accurate map. In the example according to FIG. 2, a correct positioning on the map takes place. This enables a correct prediction of the lane 2 driven in by the vehicle 'in the curve, whereby a successful avoidance of a collision of the vehicle 1 with an obstacle 3 in the curve is enabled.

FIG. 3 shows possible consequences of an incorrect positioning of the vehicle 1 on the map. This results in an incorrect prediction of the lane 2 driven in by the vehicle 1 in the curve, whereby the risk of a collision of the vehicle 1 with the obstacle 3 in the curve is created.

Figure 4:
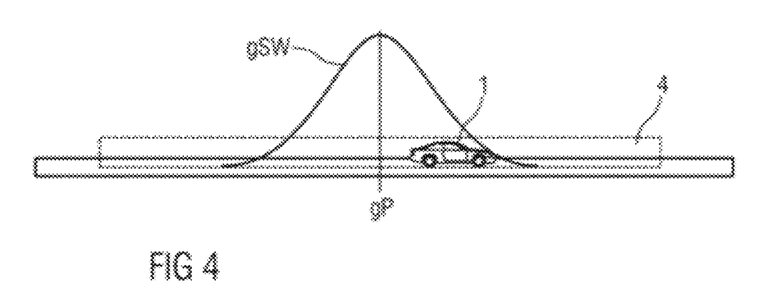

For such applications, reliable and complete information about the quality of the positioning is necessary. Sigma values, i.e., values of a common accuracy estimation, reflect only a current fit accuracy of the data, yet the positioning information P is often ambiguous and/or multimodal, and incorrect results can deviate arbitrarily from the estimated value. Thus, a secure boundary box 4 around the estimated position gP is needed, which contains the true position with certainty, at least up to a predetermined allowable error rate, as shown in FIG. 4. Here, the vehicle 1, the estimated position gP of the vehicle 1, the estimated sigma value gSW (standard deviation), and the secure boundary box 4 are depicted.

For GNSS-based methods, i.e., for methods based on a global navigation satellite system, there are already proven methods for monitoring the integrity of the position determination. Some of these methods only require receiver data, for example Receiver Autonomous Integrity Monitoring (RAIM). The resulting secure boundary boxes 4 are called Protection Limits, i.e., upper error limits PL.

As already mentioned above, for landmark-based positioning, methods for integrity monitoring are rare so far and do not go beyond outlier detection or binary "seals of approval". A Protection Limit, i.e., an error upper limit PL, is not provided by any of these methods.

With the method and system described here, the calculation of a secure limit box, i.e., the upper error limit PL, is made possible for a purely landmark-based positioning method. This has two clear advantages over existing concepts. It allows a secure positioning on the map in scenarios and/or environments where GNSS-based methods are not available. Furthermore, a combination with GNSS-based integrity monitoring is possible to obtain a smaller and/or more secure boundary box 4. In such a combination, a smaller boundary box 4 with a comparable false report rate can be achieved through an intersection of both upper error limits PL. By combining the two upper error limits PL, a slightly larger boundary box 4 is determined, but with a false report rate that is considerably lower than anything which could be achieved with a single method.

In the following, the prerequisites for carrying out this method are described. The landmark-based positioning must be able to include and follow all positioning information P, including all uncertainties and ambiguities, with the least possible loss. Therefore, the method is preferably implemented as a probabilistic filter PF. The probabilistic filter evaluates the position hypotheses with a distribution model for correct information and a distribution model for misleading information and determines how well a position hypothesis matches the distribution model for correct information versus matching with the distribution model for misleading information. This evaluation is based on the idea that position hypotheses that are distributed in such a way that they accumulate in spatial proximity are based on correct landmark associations, i.e., on correct information, and that position hypotheses to which this does not apply are based on false landmark associations, i.e., on misleading information. The result of this determination is the integrity value. It is higher the more the position hypotheses matches the distribution model for correct information compared to the match with the distribution model for misleading information.

Figure 5:
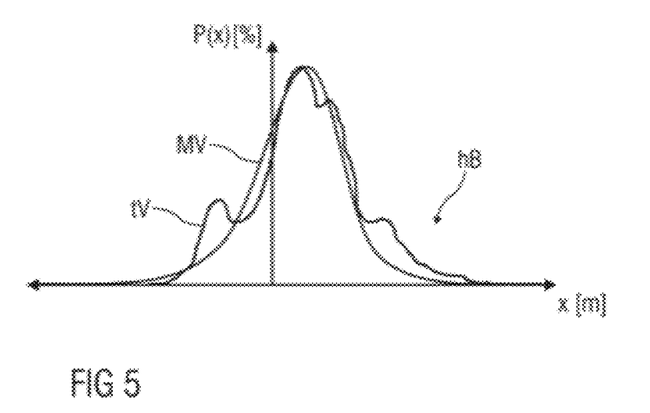

Parametric representations of positioning information P, for example as a Gaussian probability distribution (normal distribution or Gaussian distribution) should only be used if the actual distribution tV also corresponds to the model distribution MV in the rear regions hB of the distribution. FIG. 5 shows the model distribution MV and the actual distribution tV of the positioning information P with respect to a distance x. Otherwise, non-parametric representations should be preferred, for example by approximating the complete distribution as a histogram.

Figure 6:
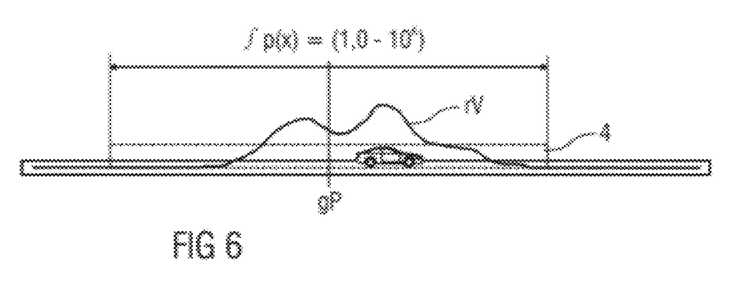

Only then, as shown in FIG. 6, can an error excess be derived by integration over the resulting distribution rV until a cumulative probability close to 1.0 is reached. How close to 1.0 depends on the predetermined allowed error rate of the upper error limit PL, i.e., on an allowed percentage for the case that the actual position may be outside the upper error limit PL.

Figure 7:
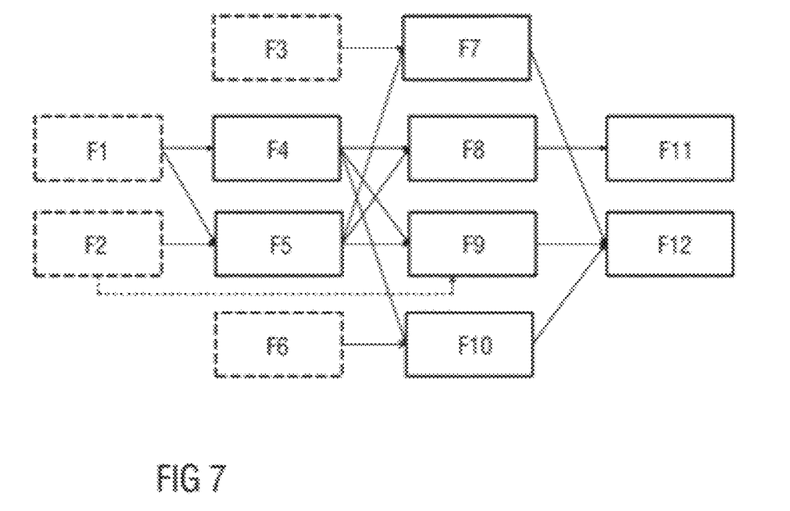

In FIG. 7, correlations are depicted which either lead to a useful information gain or to a misleading information gain. The depicted fields each have the following meaning:

F1 event: landmark object present.

F2 event: occlusion.

F3 event: incorrect information landmark object on map.

F4 correct information landmark object on map.

F5 correct information landmark object detected by a sensor system

F6 event: incorrect information from sensor detection. This comprises the detection of every landmark object not recorded on the map, even those which actually exist.

F7 A landmark object on the map resulting from incorrect information and a landmark object that has been detected correctly by the sensor system match.

F8 A landmark object on the map resulting from incorrect information and a landmark object that has been detected correctly by the sensor system match.

F9 A landmark object on the map resulting from correct information and an incorrect landmark object that has been detected correctly by the sensor system match.

F10 A landmark object on the map resulting from correct information and a landmark object resulting from incorrect information from the sensor detection match.

F11 Useful information gain.

F12 Misleading information gain.

In the following, the handling of misleading information is described. The problem is that probabilistic filters PF can handle uncertainty and misleading information as long as their statistics are modelled correctly and data sets are statistically relevant. However, due to the rarity of landmark objects LMS, LMK, the amount of misleading information can be very different for each scenario. This makes it difficult to calculate error limits PL, which are not immensely large.

The solution to this problem is to never include new information immediately, but rather to track everything until a sufficiently large sample set is available, and repeatedly analyze all possible matches between sensor landmark objects and map landmark objects to determine their likelihood of being harmful information.

Figure 8:
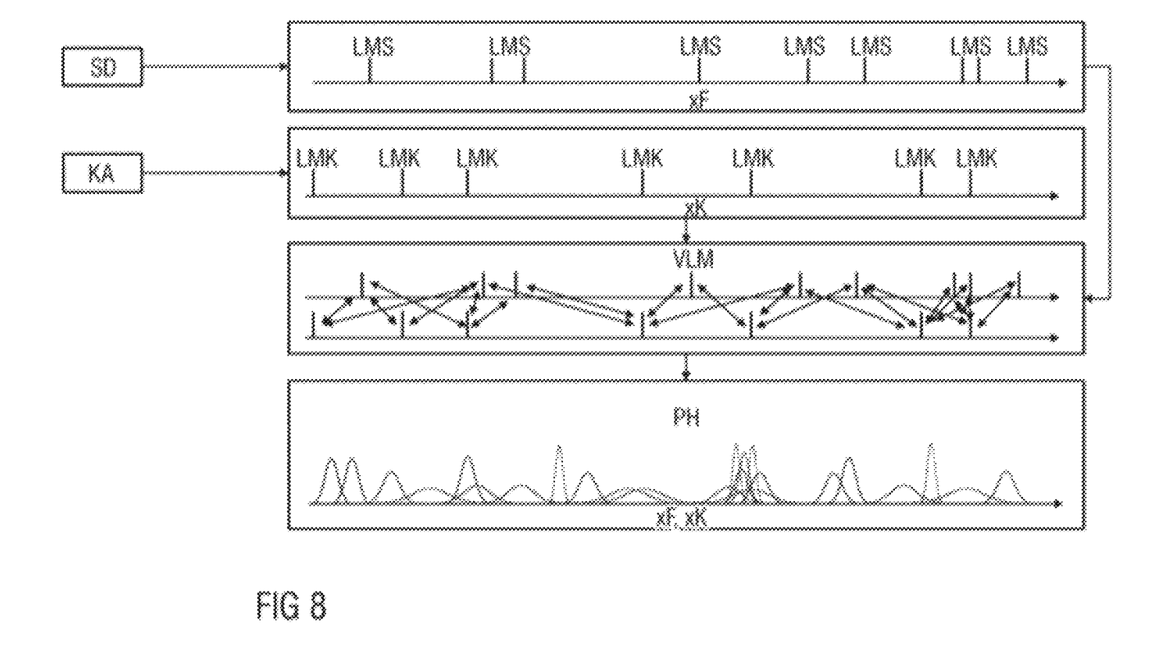

The method thus comprises three steps, as described above. In the first step, the comparison VLM of the sensor landmark objects LMS from the sensor data SD with the map landmark objects LMK from the map is carried out, as shown in FIG. 8. For this purpose, a spatial pattern of the sensor landmark objects LMS over a distance xF of the vehicle 1 is determined from the sensor data SD of the sensor system of the vehicle 1. From the map section KA, a spatial pattern of the map landmark objects LMK is determined in the same spatial frame over a map path xK. Now the comparison VLM of these landmark objects LMS, LMK, more precisely a comparison VLM of the patterns of the landmark objects LMS, LMK, is carried out. From this, several position hypotheses PH are determined. Until then, the method is advantageously at least substantially identical to the method depicted and described in FIG. 1, wherein advantageously, all sensor landmark objects LMS detected by the sensor system of the vehicle 1, in particular also sensor landmark objects LMS already passed by the vehicle 1, are taken into account. The comparison VLM thus takes into account the recorded histories of the sensor landmark objects LMS.

In the comparison VLM, all possible landmark associations are taken into account, not only the nearest landmark objects, such that a plurality of position hypotheses PH are determined. Each position hypothesis PH has a spatial uncertainty based on measurement noise, map errors, and odometry uncertainties (some observations might be quite far behind).

Figure 9:
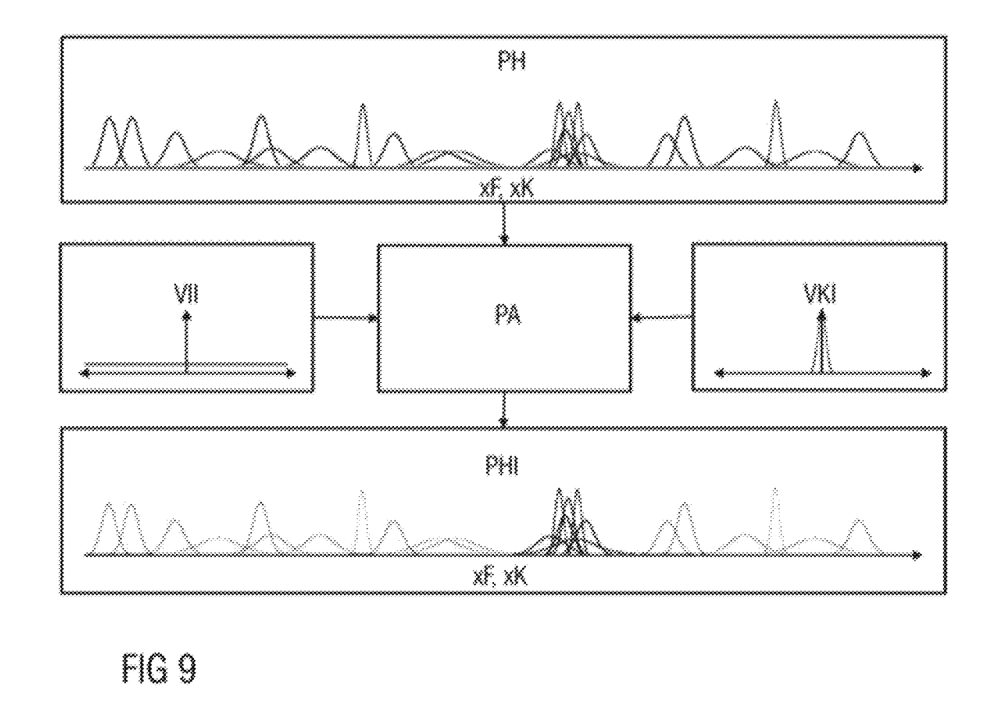

In the second step of the method, the probabilistic analysis is carried out, as shown in FIG. 9. Here, an integrity value is determined for each position hypothesis PH by an analysis of all position hypotheses PH. For this purpose, the probabilistic analysis PA is carried out with the position hypotheses PH, a distribution model VII of misleading information and a distribution model VKI of correct information. The position hypotheses PHI with integrity values result from this.

Incorrect information follows a different distribution than the correct information, normally very independent of the actual position, for example an equal spatial distribution. The non-outlier matches are necessarily related to the actual position and form any possible spatial shape around it, for example a Gauss distribution. If one analyses all position hypotheses in relation to each other, one obtains an estimate of the probability that each of them comes from one of the two distributions, and thus their probability of being misleading information.

Figure 10:
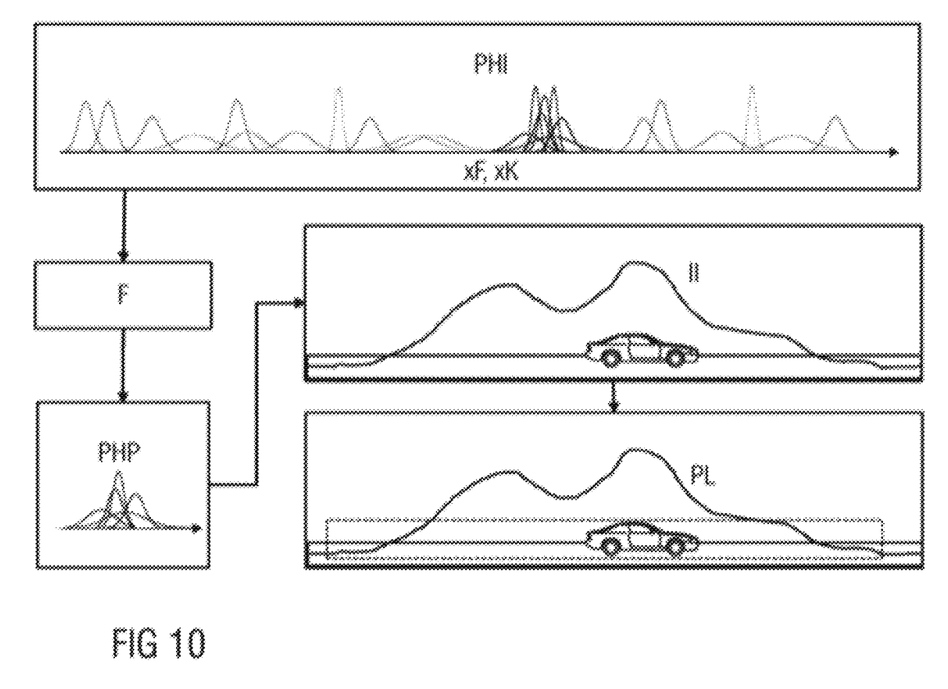

In the third step of the method, information is included, as shown in FIG. 10. By filtering F the position hypotheses PHI according to the magnitude of its integrity values with respect to the predetermined integrity limit, a subset of position hypotheses PHP with an integrity required for the position determination of the vehicle 1 is obtained. This means that all position hypotheses PHP of this subset have an integrity value that is at least equal to the predetermined integrity limit. The individual position hypotheses of this subset each represent individual probability distributions for the vehicle position. Subsequently, the probability distribution of the vehicle position corresponding to this entire subset is determined from the set of these individual probability distributions, i.e., from the entire subset of position hypotheses. Then the upper error limit PL is determined by an integration II using this probability distribution. The upper error limit PL is determined as shown in FIG. 6. The boundary box 4 shown there corresponds to the upper error limit PL.

The position hypotheses PHI with integrity values are filtered according to their chances of being misleading information. The threshold depends on the predetermined permissible error rate. The lower the threshold value, the less position hypotheses PHI with integrity values are considered good enough, i.e., having sufficient positional accuracy, which limits the availability of positioning. If only the "good" information is used, it is ensured that the calculated uncertainty profile of the position does not underestimate the actual error. Ultimately, this allows the derivation of upper error limits from this uncertainty profile.

Figure 11:
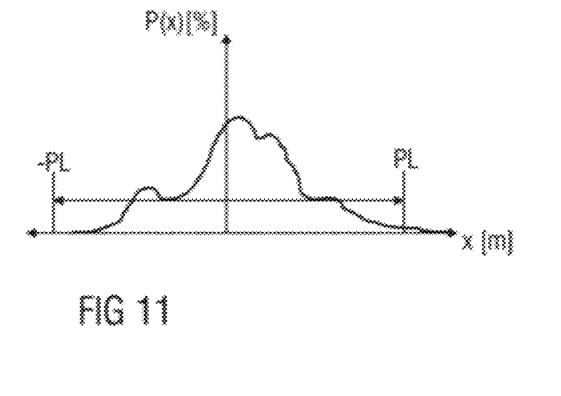
Figure 12:
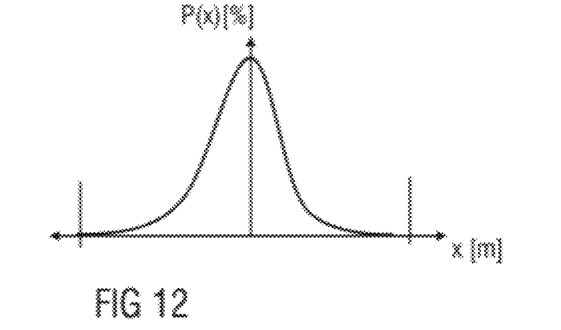

Finally, the upper error limit PL is explained. FIG. 11 shows an unknown actual distribution of errors between the negative and positive upper error limit PL. $\mu$ is the mean value and sigma is the root of the normalized sum of the deviations from the mean value. FIG. 12 shows an assumed distribution of errors.

The given accuracy is the typical deviation from the actual value, i.e., the sigma of the actual distribution. The specified error limit PL is the boundary box 4, which contains the actual vehicle position except for a permissible residual error of, for example, 10e-7 errors per km. The specified availability is the percentage of the time in which the system can provide this upper error limit PL.

The accuracy can be verified to a large extent with large test sample sets and a basic truth reference. An online optimization software also generates sigma values to indicate the estimated accuracy, yet this is based on a model distribution of errors, which can differ significantly from the actual distribution. Therefore, this is not the real precision, and not sufficient to determine an upper error limit PL, such that an additional monitoring is necessary. In contrast, the upper error limit PL can be determined with the method described above.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for landmark-based positioning of a vehicle, the method comprising:
    detecting, by a sensor system of the vehicle, sensor landmark objects in an environment of the vehicle, wherein the sensor system is an image sensor system capturing the sensor landmarks objects in an environment of the vehicle or the sensor system is a LIDAR sensor system measuring reflections from the sensor landmark objects;
    forming associations between the sensor landmark objects and map landmark objects by comparing the sensor landmark objects with the map landmark objects stored in a section of a map;
    determining a plurality of position hypotheses as assumptions for the vehicle position based on the formed associations;
    determining, for each position hypothesis, an integrity value using probabilistic analysis of each of the position hypotheses;
    filtering the position hypotheses according to integrity values of the position hypotheses to determine a subset of position hypotheses, wherein position hypothesis of the subset of position hypotheses have integrity values fulfilling a predetermined requirement;
    determining a probability distribution of the vehicle position based on the subset of the position hypotheses; and
    determining, using the probability distribution of the vehicle position, a position of the vehicle on the map.

2. The method of claim 1, wherein a most probable position of the vehicle is determined as the vehicle position from the determined probability distribution of the vehicle position and a predetermined permissible error rate, and an upper error limit is determined for the vehicle position.

3. The method of claim 2, wherein the determined vehicle position including the determined upper error limits of the vehicle position and a position of the vehicle determined by a global navigation system including an upper error limit of the position of the vehicle determined by a global navigation system are merged with each other.

4. The method of claim 1, wherein sensor landmark objects already passed by the vehicle are also used for the comparison of the sensor landmark objects and the map landmark objects.

5. The method of claim 1, wherein sensor landmark objects detected by the sensor system of the vehicle are used for the comparison of the sensor and map landmark objects over a predetermined time period and/or over a predetermined route length.

6. The method of claim 1, wherein the vehicle includes an automated driving operation, the method further comprising:
    operating the vehicle in the automated driving operation based on the determined position of the vehicle on the map.

7. The method of claim 1, wherein the filtering of the position hypotheses is performed by a localization filter.

8. The method of claim 7, wherein the localization filter is a histogram filter.

9. The method of claim 1, further comprising:
    determining a satellite-based position of the vehicle using a global navigation satellite system;
    determining whether an integrity of the satellite-based position and an integrity of the determined position of the vehicle on the map are both within an upper error limit; and
    merging the satellite-based position and an integrity of the determined position of the vehicle on the map responsive to determining that the integrity of the satellite-based position and the integrity of the determined position of the vehicle on the map are both within an upper error limit.

* * * * *